April 27, 1937.    C. C. MILLER    2,078,403
COUNTERCURRENT CONTACTOR
Filed March 21, 1935    2 Sheets-Sheet 1
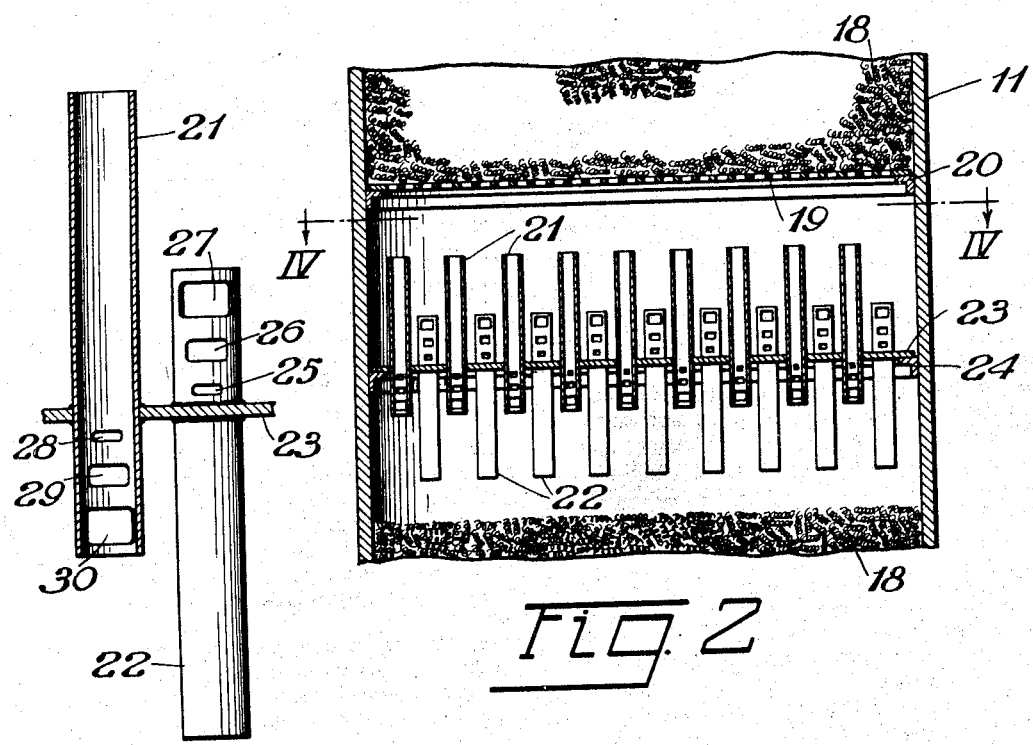
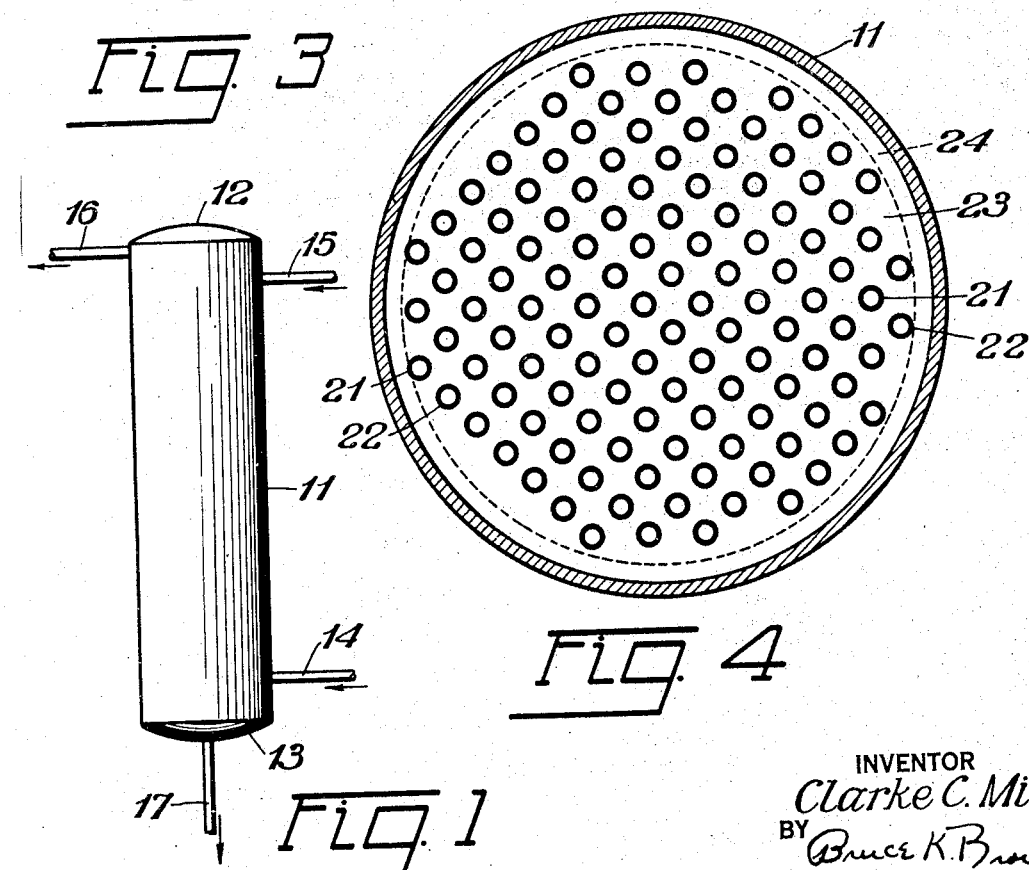
INVENTOR
Clarke C. Miller
BY Bruce K. Brown
ATTORNEY April 27, 1937. C. C. MILLER 2,078,403
COUNTERCURRENT CONTACTOR
Filed March 21, 1935 2 Sheets-Sheet 2
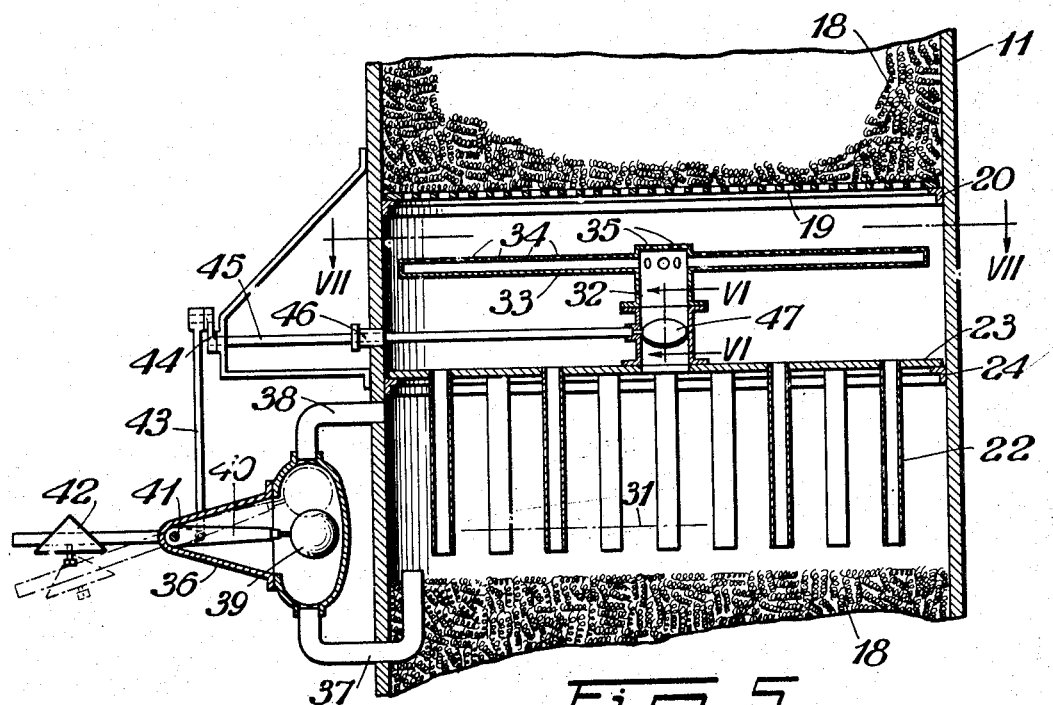

Patented Apr. 27, 1937

2,078,403

UNITED STATES PATENT OFFICE 2,078,403

COUNTERCURRENT CONTACTOR

Clarke C. Miller, Wood River, Ill., assignor to Standard Oil Company, Chicago, Ill., a corporation of Indiana Application March 21, 1935, Serial No. 12,337

12 Claims. (Cl. 196—46)

This invention relates to the art of contacting two liquids differing substantially in specific gravity and immiscible or only partially miscible with each other under the conditions at which they are contacted.

This contacting problem is important in a large number of industrial applications to which my invention is applicable, but one of its most important applications, and the one to which my invention has particular reference, is the extraction of oils by means of selective solvents. It is known that lubricating oil stocks, burning oil stocks and gasoline stocks can be extracted with a large list of known selective solvents and selective solvent mixtures in order to produce two oil fractions differing markedly in chemical and physical properties from each other. The contacting of the oil and selective solvent can be performed in various ways. Thus, the two can be heated together to a temperature above their miscibility temperature and can then be cooled to produce the desired two phases. Similar results can be obtained by pressure variations in some cases. Another method is to agitate the oil and selective solvent together at temperatures below the miscibility temperature and then separate the desired two phases.

The aforementioned contacting methods are single stage methods and are characterized by a very incomplete separation of the oil into its two groups of constituents. The art has therefore largely turned to countercurrent methods of contacting in which the separation of the two groups of constituents can be carried more nearly to completion. The commonest countercurrent method is the use of a plurality of one stage steps. Thus, the oil and solvent are contacted in a mixer separated in a settler, and the separated materials pass in opposite directions to other mixing and separating steps, each of which pairs of steps constitutes a "stage". As many as 7 or 8 stages may be used. This type of process, which may be referred to as a batch countercurrent process, requires a large amount of equipment, including a large number of expensive pumps, which not only increases the cost and difficulty of operation but provides opportunities for leakage and solvent losses. Other types of countercurrent contacting equipment have therefore been proposed and used. Much of this equipment has been highly complicated and none of it has been completely satisfactory.

The simplest method of countercurrent contacting and one well known to the art involves the use of a vertical tower, the light liquid being introduced near the bottom, the heavy liquid being introduced near the top, the two passing in countercurrent flow with relationship to each other and being removed from the ends of the tower respectively opposite the ends at which they were introduced. The point of withdrawal of the heavy liquid is below the point of admission of the light liquid and the point of withdrawal of the light liquid is above the point of admission of the heavy liquid.

Towers of this type may be baffled to provide tortuous flow or may be packed with some type of filler for this same purpose. Such towers work very nicely in laboratory sizes but have generally been found impracticable when expanded to the dimensions necessary for plant scale operations in the petroleum industry. This impracticability appears to be due to the fact that the ascending liquid and the descending liquid do not remain evenly distributed throughout the tower but tend to reduce their respective flow resistances by ascending or descending in large streams. This is known as "channeling". In extreme cases the heavy liquid will descend on one side of the tower and the light liquid ascend on the other, with the result that very little contacting is accomplished. Thus, a very large tower which might be expected to be equivalent to 6 or 7 stages in a batch countercurrent process may be found to be equivalent to one or two at most.

It is an object of my invention to overcome this difficulty in the use of vertical countercurrent contacting towers by providing means for the redistribution of the ascending and/or descending streams at intervals throughout the tower. Other and more detailed objects of my invention will become apparent as the description thereof proceeds.

Reference will now be had to the accompanying drawings which form a part of this specification and in which:

Figure 1 is a diagrammatic elevation of a tower of the type to which I prefer to apply my invention;

Figure 2 is a vertical cross-sectional view of a portion of a tower in accordance with my invention;

Figure 3 is an enlarged view of one of the downcomers and one of the upcomers shown in Figure 2;

Figure 4 is a horizontal section taken along the line IV—IV of Figure 2;

Figure 5 is a vertical section of a portion of a tower embodying a modified form of my invention;

Figure 6 is a partial vertical section taken along the line VI—VI of Figure 5; and Figure 7 is a horizontal section taken along the line VII—VII of Figure 5.

Referring now to the drawings in more particular, Figure 1 shows a cylindrical tower formed by shell 11, top closure 12 and bottom closure 13. The lighter liquid, which in my preferred embodiment is a lubricating oil or other petroleum oil, is admitted near the bottom of the tower through inlet 14 and is preferably distributed throughout the cross-section of the tower by some suitable means such as a series of perforated pipe rings. Similarly the heavy liquid, which in my preferred embodiment is a selective solvent (since most of the known selective solvents have specific gravities greater than that of oil) is introduced near the top of the tower through inlet 15. The oil then passes upward and the solvent downward due to the difference in their specific gravities. The ascending oil passes beyond the point of introduction of the solvent and is then removed from the tower through outlet 16. Similarly the descending solvent passes beyond the point of introduction of the oil and is likewise removed from the tower through outlet 17. These features are well known in the art and are therefore not described in detail. My invention is principally concerned with the intermediate portion of the tower, which in the prior art has usually been either empty, packed with some type of filler or equipped with baffles of one sort or another.

The tower of my invention is broken up into a plurality of stages located between inlet 14 and inlet 15. These stages may, for instance, be from 3 to 20 and preferably from 5 to 15 in number. Each stage approaches an ideal batch countercurrent stage, or, in other words, approaches the results obtained by perfect contacting and perfect separation. Each of the stages in my tower is composed of two parts, a contacting part and a separation and re-distribution part. In the form shown, the contacting part consists of a layer of packing 18 supported on a perforated plate 19 which is in turn supported by a ring 20 welded to shell 11. The packing 18 may be of any known type such as pieces of ceramic material, Raschig rings, etc., but I prefer to use small metallic springs, as shown, since I find this type of packing material highly satisfactory. The layer of packing may be of any desired height, for instance, from half the diameter of the tower to the diameter of the tower. Instead of using a packed space for the contacting portion of each of my stages, I can use a series of baffles, or even an empty space, but I strongly prefer to use the packing as described.

The second portion of each of my stages is the separation and redistribution means. In the form shown in Figures 2, 3 and 4 this is made up of a series of upcomers 21 and a series of downcomers 22 fastened into a partition 23 which is supported on a ring 24 which is in turn supported by the shell 11. These upcomers and downcomers are arranged alternately so that uniform distribution of the ascending stream and descending stream is obtained. As the descending stream, which in my preferred embodiment is the solvent, passes downward from the upper contacting space shown in Figure 2, a small portion of it enters the tops of downcomers 22 which are shown open and the remainder accumulates on top of partition 23. Some of this accumulating material passes through small lateral openings 25 in downcomers 22 and thence together with the material which enters the tops of downcomers 22 passes to the lower contacting space shown in Figure 2. Since lateral openings 25 are restricted, the layer of solvent on partition 23 tends to build up until it reaches openings 26 and eventually lateral openings 27. Since these openings are progressively larger the resistance to the downward passage of the solvent is decreased as the layer increases in height and the depth of the layer thus reaches an equilibrium. The result is that a constant depth of solvent is maintained on partition 23. This solvent passes in substantially equal quantities through each of the downcomers 22 thereby securing uniform distribution of the solvent over the packing material 18 in the next lower contacting space. Even though practically all of the solvent may "channel" in the upper contacting space and thus pass down on one side of the tower it is redistributed before passing on to the next stage.

Similarly, upcomers 21 are equipped with lateral openings 28, 29 and 30 of increasing size so that a layer of the ascending liquid, which is oil in my preferred embodiment, accumulates below partition 23 to a constant depth and uniform distribution of this material is likewise obtained. It will be seen from the drawings (Figure 2) that all corresponding lateral openings lie in the same horizontal plane with each other, i. e. for example, all of the lateral openings 27 in downcomers 22 have their liquid level controlling edges in the same horizontal plane.

The lower ends of upcomers 21 and the upper ends of downcomers 22 can be made closed if desired so that no material can pass directly through them but all of it must first accumulate above or below partition 23 and then pass through the lateral openings 25, 26 and 27 or 28, 29 and 30.

Another alternative which will accomplish the same result but which requires a very careful selection of the size and number of the downcomers and upcomers is to eliminate those portions of upcomers 21 lying below partition 23 and those portions of downcomers 22 lying above partition 23. With this arrangement, if the size and number of upcomers and downcomers is correct, there is sufficient flow resistance so that a layer of solvent is built up above partition 23 and a layer of oil below it until the respective heads of these two materials are sufficient to force them through the respective upcomers and downcomers at a rate equal to the accumulation of the corresponding layers. However, if the upcomers and downcomers are too large or too numerous these layers will not accumulate and if they are too small or too few the layers will build up to such an extent as to interfere with the operation.

Turning now to Figures 5, 6 and 7 it will be seen that these illustrate an alternative form of the separation and redistribution portion of my apparatus. The shell 11, packing material 18, plate 19, ring 20, partition 23 and ring 24 are equivalent to the corresponding elements in Figures 2, 3 and 4. Downcomers 22, however, are in this case merely simple pipes depending from partition 23 and open at both ends as in the case of the modification discussed in the last paragraph. It will be understood, however, that the type of downcomers shown in Figures 2 and 3 may very suitably be used in connection with this modification.

In Figure 5 the ascending material accumulates below partition 23 to form a layer or pool, the bottom of which is indicated at 31. This material flowing upward through conduit 32 which is supported by partition 23 and is in registry with a central opening in that plate. The material flowing upward through conduit 32 passes outward through radial arms 33 shown best in Figure 7 and thence passes upward through perforations 34 in said radial arms. The perforations at the outer ends of radial arms 33 are larger or more numerous than those at the inner ends of the arms in order to obtain uniform distribution throughout the horizontal cross section of the tower. In the form shown, perforations 34 are closer together at the outer ends of radial arms 33 and the spacing is progressively increased towards the center of the tower. Small perforations 35 located in the top closure of the conduit 32 are used to secure distribution of the ascending stream at the center of the tower.

In this modification, the depth of the layer of oil or other ascending liquid below partition 23 is controlled by mechanical means. A float chamber 36 has its lower end connected by means of pipe 37 with the heavy liquid in the space below interface 31. Similarly the upper end of float chamber 36 is connected with the light liquid above interface 31 by means of pipe 38. Float 39 within float chamber 36 is supported by arm 40 pivoted at 41 and counterweighted by weight 42. Arm 40 is attached to a vertical member 43 which is in turn attached to a crank 44 and to a shaft 45 journaled into shell 11 at 46. The position of interface 31 controls the position of float 39 which in turn controls the motion of members 40, 43, 44 and 45 in such manner that when float 39 is at the top of float chamber 36 (as shown in broken lines in Figure 5) a butterfly valve 47 attached to shaft 45 is in contact with the walls of conduit 32, or in other words is in closed position. Thus, when the layer of light liquid below partition 23 decreases in depth to a certain point, valve 47 automatically closes until the depth of this layer increases. As the depth increases, free upward flow through conduit 32 is permitted and a point is soon reached at which valve 47 opens. In general valve 47 will remain at some intermediate position (as shown in Figure 5 in full lines) when the tower is running smoothly. This mechanism thus insures a constant head of ascending liquid below partition 23 and a substantially constant and uniform flow through openings 34 and 35. It also insures maintaining a layer of descending liquid above the lower layer of packing material 18, in this way providing a uniform distribution of the descending liquid over the packing material.

While I have described my invention in connection with certain specific embodiments thereof, I do not wish to be limited thereby but only to the liberal scope of the appended claims in which I have defined the novel features of my invention.

I claim:

1. In a vertical tower for countercurrently contacting two liquids which differ in specific gravity and are at least partially immiscible with each other, a horizontal partition in said tower so constructed and arranged that a pool of heavy liquid accumulates above it and a pool of light liquid below it, means supported by and rising from said partition for conveying light liquid from below said partition through said pool of heavy liquid and out of contact with it and for evenly distributing said light liquid throughout the cross sectional area of said tower above said pool of heavy liquid, said last mentioned means being provided with flow control means for controlling the depth of said pool of light liquid, and separate means comprising a series of downcomer pipes depending from said partition at a large number of points substantially uniformly distributed throughout the cross sectional area of said tower for conveying heavy liquid from above said partition through and out of contact with said pool of light liquid and for evenly distributing said heavy liquid throughout the cross sectional area of said tower below said pool of light liquid.

2. In a vertical counter-current tower for contacting two liquids differing in specific gravity and at least partially immiscible with each other, a distributor comprising a partition extending across said tower, separate upcomer and downcomer means, at least one of said means comprising a multitude of short vertical pipes carried by said partition, said pipes each having a plurality of vertically spaced lateral openings of varying size, the size of said lateral openings increasing with the distance of said lateral openings from said partition, corresponding lateral openings in the various pipes being in substantially the same horizontal plane.

3. In a vertical tower for the contacting of an ascending liquid with a descending liquid, said two liquids being at least partially immiscible with each other and differing substantially from each other in specific gravity, a substantially horizontal partition in said tower, a series of downcomers depending from said partition at a large number of points substantially uniformly distributed throughout the cross sectional area of said tower, said downcomers being in communication at their upper ends with the space above said partition and in communication at their lower ends with the space below said partition, and a series of upcomers rising from said partition at a large number of points substantially uniformly distributed throughout the cross sectional area of said tower, said upcomers being in fluid communication at their lower ends with the space below said partition and at their upper ends with the space above said partition, said upcomers projecting a substantial distance below said partition to cause the formation of a pool of said ascending liquid below said partition and in contact with said partition.

4. In a vertical tower for the contacting of an ascending liquid with a descending liquid, said two liquids being at least partially immiscible with each other and differing substantially from each other in specific gravity, a substantially horizontal partition in said tower, a series of downcomers projecting through said partition at a large number of points substantially uniformly distributed throughout the cross sectional area of said tower, said downcomers being in communication at their upper ends with the space above said partition and in communication at their lower ends with the space below said partition, and a series of upcomers projecting through said partition at a large number of points substantially uniformly distributed throughout the cross sectional area of said tower, said upcomers being in fluid communication at their lower ends with the space below said partition and at their upper ends with the space above said partition, the upper ends of said upcomers being substantially above the upper ends of said downcomers, the upper ends of both said upcomers and said downcomers being substantially above said partition, the lower ends of said downcomers being substantially below the lower ends of said upcomers, the lower ends of both said downcomers and said upcomers being substantially below said partition, whereby pools of said two liquids are caused to form adjacent said partition and whereby liquid from each of said pools is conveyed through the other of said pools.

5. Structure according to claim 4 in which said upcomers are equipped below said partition with lateral openings to control the depth of the pool of said ascending liquid accumulating below and in contact with said partition.

6. Structure according to claim 4 in which said downcomers are equipped above said partition with lateral openings to control the depth of the pool of said descending liquid accumulating above and in contact with said partition.

7. In a vertical tower for the contacting of an ascending liquid with a descending liquid, said two liquids being at least partially immiscible with each other and differing substantially from each other in specific gravity, a substantially horizontal partition in said tower, a series of downcomers depending from said partition at a large number of points substantially uniformly distributed throughout the cross sectional area of said tower, said downcomers being in communication at their upper ends with the space above said partition and in communication at their lower ends with the space below said partition and a series of upcomers rising from said partition at a large number of points substantially uniformly distributed throughout the cross sectional area of said tower, said upcomers being in fluid communication at their lower ends with the space below said partition and at their upper ends with the space above said partition, said upcomers projecting a short distance below said partition and having lateral openings below said partition to control the depth of a pool of said ascending liquid accumulating below and in contact with said partition.

8. In a vertical tower for the contacting of an ascending liquid with a descending liquid, said two liquids being at least partially immiscible with each other and differing substantially from each other in specific gravity, a substantially horizontal partition in said tower, a series of downcomers depending from said partition at a large number of points substantially uniformly distributed throughout the cross sectional area of said tower, said downcomers being in communication at their upper ends with the space above said partition and in communication at their lower ends with the space below said partition, said downcomers projecting a short distance above said partition and having lateral openings above said partition to control the depth of a pool of said descending liquid accumulating above and in contact with said partition, and a series of upcomers rising from said partition at a large number of points substantially uniformly distributed throughout the cross sectional area of said tower, said upcomers being in fluid communication at their lower ends with the space below said partition and at their upper ends with the space above said partition.

9. In a vertical tower for countercurrently contacting two liquids which differ in specific gravity and are at least partially immiscible with each other, a horizontal partition in said tower so constructed and arranged that a pool of heavy liquid accumulates above it and a pool of light liquid below it, means supported by and rising from said partition for conveying light liquid from below said partition through said pool of heavy liquid and out of contact with it and for evenly distributing said light liquid throughout the cross sectional area of said tower above said pool of heavy liquid, and separate means comprising a series of downcomer pipes depending from said partition at a large number of points substantially uniformly distributed throughout the cross sectional area of said tower for conveying heavy liquid from above said partition through and out of contact with said pool of light liquid and for evenly distributing said heavy liquid throughout the cross sectional area of said tower below said pool of light liquid, at least one of said conveying means consisting essentially of a multitude of short vertical pipes each provided with lateral openings.

10. In a vertical tower for countercurrently contacting two liquids which differ in specific gravity and are at least partially immiscible with each other, a horizontal partition in said tower so constructed and arranged that a pool of heavy liquid accumulates above it and a pool of light liquid below it, means supported by and rising from said partition for conveying light liquid from below said partition through said pool of heavy liquid and out of contact with it and for evenly distributing said light liquid throughout the cross sectional area of said tower above said pool of heavy liquid, and separate means comprising a series of downcomer pipes depending from said partition at a large number of points substantially uniformly distributed throughout the cross sectional area of said tower for conveying heavy liquid from above said partition through and out of contact with said pool of light liquid and for evenly distributing said heavy liquid throughout the cross sectional area of said tower below said pool of light liquid, at least one of said conveying means consisting essentially of a multitude of substantially equally spaced short vertical pipes extending through and from the partition and provided with lateral openings gradually increasing in size in the direction away from the partition.

11. In a vertical tower for the contacting of an ascending liquid with a descending liquid, said two liquids being at least partially immiscible with each other and differing substantially from each other in specific gravity, a substantially horizontal partition in said tower, said partition serving for the accumulation of a pool of one of said liquids on one side of said partition, means for conveying the other of said liquids through said partition, a conduit attached to said partition and in registry with an opening in said partition for conveying liquid from said pool through said partition, means connected with said conduit on the side of said partition opposite said pool for distributing liquid from said pool uniformly throughout the cross sectional area of said tower, means located in said conduit for controlling the passage of said liquid through said conduit and means responsive to the depth of said pool for controlling said last mentioned means.

12. In a vertical tower for the contacting of an ascending oil with a descending selective solvent, said oil and said solvent being partially miscible with each other and said solvent having a substantially greater specific gravity than said oil, a substantially horizontal partition in said tower, said partition serving for the accumulation of a pool of said oil beneath said partition and in contact with said partition, a conduit rising from said partition and in registry with an opening in said partition for conveying oil through said partition, means connected with said conduit above said partition for distributing oil from said pool uniformly throughout the cross sectional area of said tower, means located in said conduit for controlling the passage of oil through said conduit and means responsive to the depth of said pool for controlling said last mentioned means.

CLARKE C. MILLER.